Feb. 6, 1934. C. G. ABBOT 1,946,184
SOLAR HEATER
Filed July 3, 1930 2 Sheets-Sheet 1
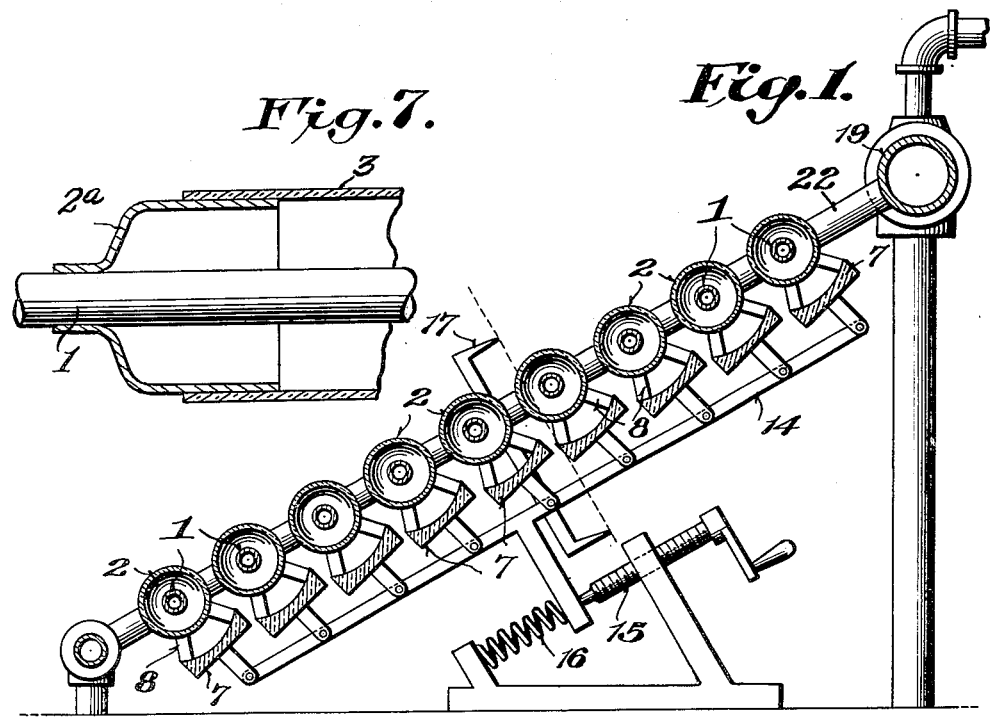
Fig. 7.
Fig. 1.
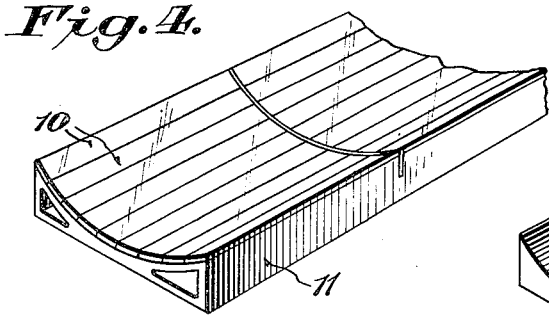
Fig. 4.
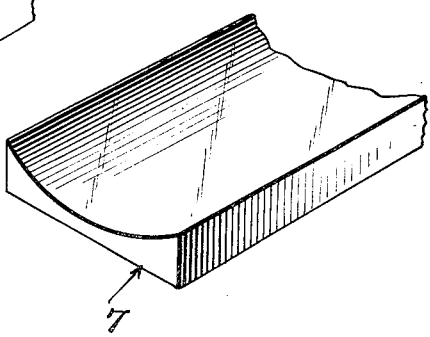
Fig. 6.
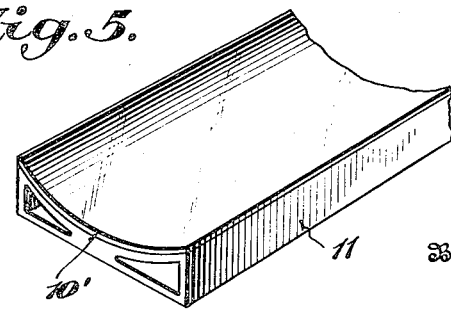
Fig. 5.
Inventor
Charles G. Abbot,
By [signature]
Attorneys Inventor
Charles G. Abbot,
By
Attorneys Patented Feb. 6, 1934

1,946,184

UNITED STATES PATENT OFFICE 1,946,184

SOLAR HEATER

Charles Greeley Abbot, Washington, D. C.

Application July 3, 1930. Serial No. 465,756

6 Claims. (Cl. 126—271)

This invention relates to apparatus for absorbing the heat of solar radiation and for rendering it useful for various purposes, such as heating liquids for domestic purposes, or for evaporation, and especially for the production of power in steam engines. The structures shown herein have for their objects to provide cheap and efficient means for concentrating the rays of the sun from large areas of exposure on to small ray-absorptive pipes arranged in a manner adapted to serve as units of steam boilers, and to effectively insulate these pipes from losses of heat.

The means employed by me to these ends comprise heat absorbers, each consisting of a hollow evacuated glass tubular body, having extending lengthwise thereof and therethrough, a metallic heating tube, to which, through an expansion joint, the glass tubular body is sealed at its ends, and an elongated reflector mounted for movement around the heating tube, such tube being in the linear focus of a reflector, with means for rotating the several reflectors around their associated tubes in order to concentrate thereon the rays from the sun in its travel, and my invention consists in the construction, arrangement, and combination of the several parts of which it is comprised, as will be hereinafter described and claimed.

Referring to the accompanying drawings, in which corresponding parts are designated by corresponding marks of reference,—

Figure 1 is a vertical section through a device embodying my invention.

Figures 4, 5 and 6 are perspective views of different embodiments of mirrors to be used with the heat absorber shown in Figure 3.

Fig. 7 is a detail of a modified form of joint.

Figure 2:
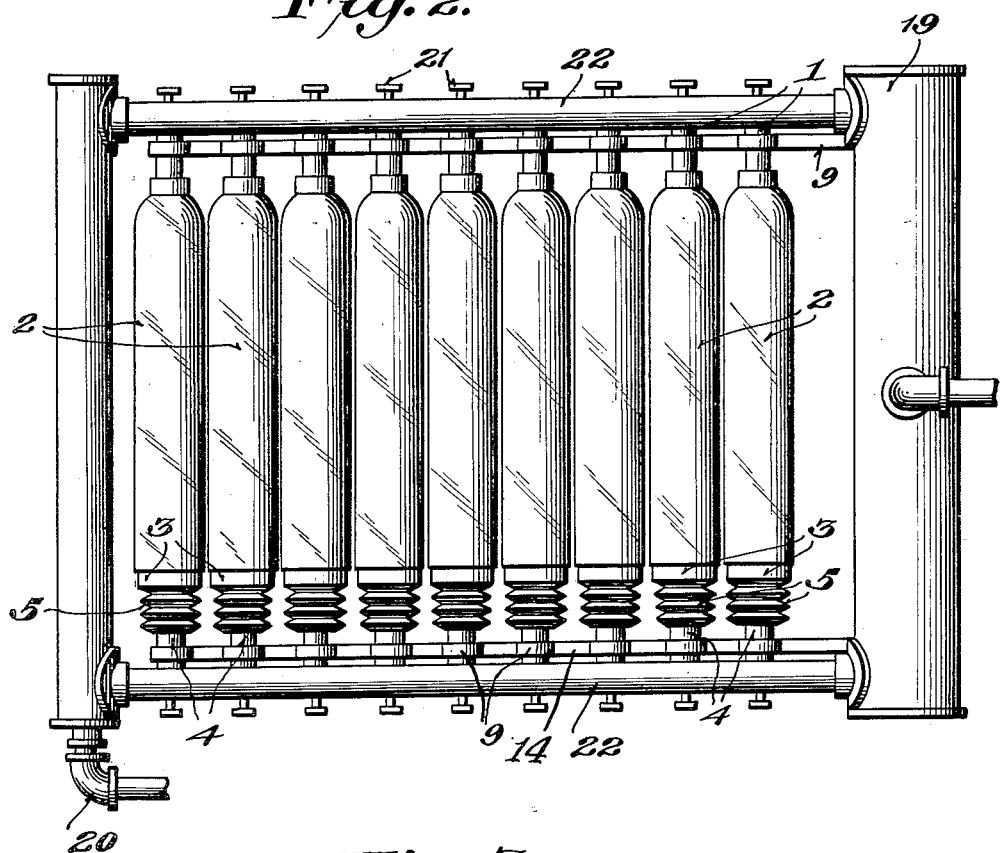
Figure 2 is a plan view thereof.
Figure 3:
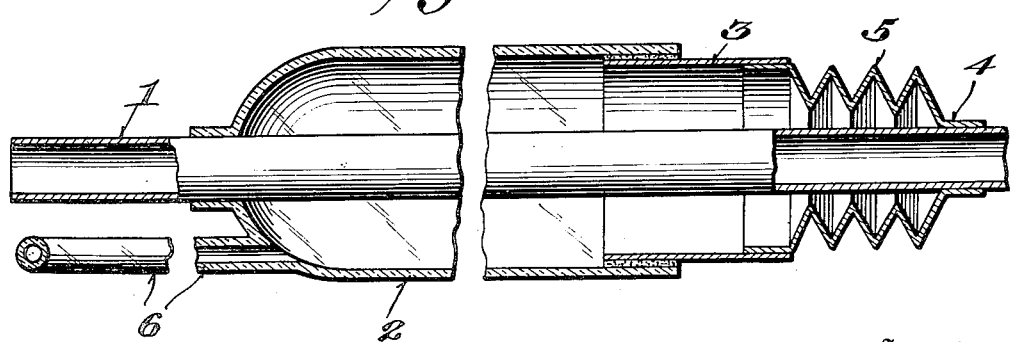
Figure 3 is a longitudinal section through a heat absorber.

Each heat absorber consists of a tube 1, preferably of blackened copper about one-half inch in diameter, and six feet long, and an evacuated lead glass tubular body 2, about one and one-quarter inches in diameter, having a high co-efficient of thermal expansion. The tube 1 is preferably blackened and made ray-absorbing by painting it with a dope composed of lampblack suspended in a weak alcoholic solution of a gum non-volatile below 300° C. and afterwards baking the tube in vacuum. The tube passes through the body 2 from end to end thereof, the ends of the tube projecting beyond the ends of the body. At one end the body is constricted in diameter and sealed in air-tight manner to the tube. In another method of construction the aforesaid end of the body is not thus constricted but a copper adapter-tube 2a, closely fitting therewithin is sealed to said end of the body by the aid of cuprous oxide flux in the manner stated below, and the other end of said adapter-tube, being constricted, is soldered to the said metallic heating tube. At the other end of the body, the latter is connected to the tube by an expansion joint. This joint, by preference, is made by inserting a copper adapter 3, inside the open unconstricted end of the body, the adapter having been first highly oxidized with a layer of black cupric oxide (CuO). The adapter when in place is sealed to the glass by heat, the cupric oxide under the heat changing to red-cuprous oxide, ($Cu_2O$) which fluxes with the glass, making a strong and air-tight connection. A collar 4 is sealed to the tube 1, and the collar and adapter are connected by a bellows connection 5, which has an inside diameter but slightly greater than the diameter of the tube, so as to offer a good support of that end of body 2 from the tube 1. The interior of the body 2 is highly evacuated through a proper tubulature 6, which is then sealed off.

Thus constructed, the heat absorber presents a surface highly absorptive of focused solar radiation, and protected by high vacuum from convection losses of heat. In order to concentrate the solar heat thereon, a reflector element or mirror 7 is associated with each heating element, each mirror having a proper curvature in vertical cross section to bring the sun rays to a focus along a line parallel with the longitudinal axis of the mirror and coincident with the center of the tube 1 of the corresponding heat absorber, and for this purpose the mirror is mounted in stirrups 8 attached to a collar 9 on the ends of such tubes beyond the body 2.

Figures 4, 5 and 6 show an individual reflector element of three convenient forms of construction. In the form shown in Figure 4, the reflecting surface is composed of a plurality of longitudinally extended flat strips of glass, 10, silvered in the usual way upon the back, and supported upon a frame 11 of light metal, as aluminum, so as to give an approximately parabolic transverse cross-section to the whole reflector. Figure 5 shows a mirror composed of a single glass sheet formed to a parabolic cylindrical curvature in transverse section, silvered on the back 10′, and supported by the suitable frame 11. In Figure 6 is shown a mirror composed of a single sheet of metal, as aluminum, or copper, formed to a parabolic transverse curvature and gold-plated and highly polished on its front surface.

The choice of these three above-described varieties of mirror-elements depends on such factors as expense, desired efficiency, and danger of breakage. The complete reflecting surface may present a width of cross-section from 3 inches upwards according to the intensity of concentration of solar radiation required for the particular purpose in view.

In heating water for domestic purposes, as for instance by installing a series of heater elements in a roof under sheet-glass, the reflector-elements should be narrow, or may even be omitted. For producing steam at high pressure for engines, the reflector-elements should be wider, even up to 10 or more inches.

Figure 1 shows a mechanical support suitable for orienting the devices in a manner adapted to raise steam for engines.

The orientation of the heater-elements shown in Figure 1 is preferably as follows: They lie in a parallel series forming a planar configuration, whose plane is at right angles to the plane of the meridian and preferably, though not necessarily, parallel to the earth's axis. The longer axes of the heat absorbers are approximately horizontal, and at right angles to the plane of the meridian. The reflector elements are rotatable about the axes of the tubes 1, and the several reflectors are connected by a link 14, whereby all such reflector elements of a series may be rotated simultaneously through an angle of 60°, or more or less. The screw and spring 15, 16, shown in Figure 1 or equivalent means, is adapted for this purpose. This linkage is so adjusted that all the reflector elements are oriented similarly with respect to the sun at all times, whatever be the angle of setting by the linkage. There is provided a gnomon, 17, to indicate the common orientation of said reflector elements with respect to the position of the sun in the sky.

By these means an attendant may keep all the reflector elements properly oriented continually so that the axes of their parabolic cross-sectional curves shall all lie in planes including the center of the sun. Under these circumstances the rays of the sun will continually focus upon the heater tubes, independently of the altitude of the sun above the horizon. In such a manner the orientation is accomplished by such simple mechanism as thus far described, requiring only slight and intermittent attention by the attendant, without the use of elaborate clockwork or costly mechanisms such as are ordinarily used to focus sun rays in astronomical instruments or solar engines.

The heater elements are associated in series covering an inclined planar area of 6 by 10 feet more or less, all operated by a single linkage, as above described. Other similar series may be situated adjacent thereto. Thus large areas, suitable to the collection of immense quantities of solar energy, may be utilized in one power plant. In such cases it is only necessary to connect the boiler tubes protruding from the several focus tubes into such a system or systems as those skilled in the art of steam engineering will immediately conceive, and providing for them, if necessary, suitable means of circulating the contained fluid, protecting outlying pipes by suitable heat insulation, and connecting into such system of piping appropriate steam chests, 19, fluid injectors, 20, and the usual accessories required to operate steam engines. As it is necessary to clean the boiler tubes occasionally, screw plugs, 21, (Figure 1) may be provided in the header pipes 22, opposite to the several heater tubes 1, enabling the attendant occasionally to clean away mud and scale by the insertion of suitable cleaning rods.

In some applications for power purposes, and especially in applications to solar cooking, I may prefer to orient the heater tubes parallel to the axis of the earth, and to rotate the reflector-element at the rate of 15° per hour by suitable clockwork. This form of mounting and driving is not here shown, as it is entirely familiar and customary in astronomical practice, in the mounting and driving of telescopes. The advantage of this method over that shown in Figure 1 lies in the capacity to collect solar radiation more efficiently when the sun is at low altitudes. Its disadvantage lies in the greater cost and complexity of mechanism.

Having thus described my invention, what I claim is:—

1. In a solar heater, the combination of a transparent tubular body, a metallic linear radiation-absorbing fluid-container, sealed in evacuated space within the transparent body; an open parabolic cylindrical reflector-element adapted to concentrate solar rays on said fluid-container; and means for orienting and maintaining said reflector-element with the axis of its parabolic curvature approximately in a plane containing the sun's center.

2. In a solar heater, the combination of a transparent tubular body, a metallic linear radiation-absorbing fluid-container, sealed in evacuated space within the transparent body; an open parabolic cylindrical reflector-element adapted to concentrate solar rays on said fluid-container; and means for orienting and maintaining said reflector-element with the axis of its parabolic curvature approximately in a plane containing the sun's center, and with its linear focus coincident with the axis of said radiation-absorbing container.

3. In a solar heater, the combination with a heating tube, of a tubular glass body surrounding a portion of the tube and having an air-tight joint therewith, the space around the tube and within the body being evacuated, an expansion joint in the connection between the tube and body, and an open parabolic cylindrical reflecting element mounted for movement around the tube, the said tube being horizontal and having its axis at right angles to the plane of the meridian.

4. In a solar heater the combination of a plurality of heat-absorbers comprising metallic ray-absorbing tubes; a plurality of vacuum-containing transparent jackets enclosing said ray-absorbing tubes and joined thereto in an air-tight manner, an open parabolic cylindric mirror rotatable about each of said ray-absorbing tubes and focussed thereupon; header-tubes connected to said ray-absorbing tubes at the ends thereof, and fluid receptacles joined to said header-tubes, the whole system comprising a stationary substantially planar assemblage adapted to collect solar rays over great areas, and employ them for the heating of fluids.

5. In a solar heater, the combination of a planar grid stationary at right angles to the plane of the meridian and composed of a plurality of ray-sorbing metallic tubes, a fluid-circulating system including the said ray-absorbing tubes, a plurality of vacuum containing transparent jackets, each jacket enclosing one of the ray-absorbing tubes and joined thereto in an air-tight manner, a plurality of concave cylindrical mirrors of parabolic curvature, each focused upon one of the said ray-absorbing tubes and rotatable on the axis thereof, and a linkage adapted to rotate all of said mirrors separately but simultaneously upon their axes.

6. In a solar heater, the combination of an open cylindrical mirror, an expansible metallic tube coated with a finely divided difficultly volatile heat-absorbing substance in the focus thereof, and a transparent evacuated jacket surrounding and sealed in an air-tight manner to said tube.

CHARLES GREELEY ABBOT.